United States Patent
Brown et al.

(10) Patent No.: US 7,729,869 B2
(45) Date of Patent: Jun. 1, 2010

(54) ELECTRONIC FLOW CHARACTERISTIC INDICATING FLOW METER

(75) Inventors: Mark A. Brown, Oak Grove, MO (US); Kendall D. Foos, Olathe, KS (US)

(73) Assignee: Burger & Brown Engineering, Inc., Grandview, MO (US)

( * ) Notice: Subject to any disclaimer, the term of this patent is extended or adjusted under 35 U.S.C. 154(b) by 279 days.

(21) Appl. No.: 11/941,795

(22) Filed: Nov. 16, 2007

(65) Prior Publication Data
US 2009/0150096 A1     Jun. 11, 2009

(51) Int. Cl.
*G01F 1/56* (2006.01)
*G01F 1/68* (2006.01)

(52) U.S. Cl. .................. 702/50; 62/127; 702/45

(58) Field of Classification Search .............. 702/45, 702/46, 47, 50, 55, 130; 73/861.02, 861.03, 73/861.27, 861.28, 861.55, 861.77, 861.78; 62/127, 129
See application file for complete search history.

(56) References Cited

U.S. PATENT DOCUMENTS

| 4,253,341 A | 3/1981 | Ikeda et al. |
| 4,656,874 A | 4/1987 | Kulig |
| 4,700,579 A | 10/1987 | Hall |
| 4,848,164 A | 7/1989 | Quarve et al. |
| 5,251,149 A | 10/1993 | Williams et al. |
| 5,323,657 A * | 6/1994 | Vander Heyden ........ 73/861.02 |
| 5,761,916 A | 6/1998 | Oswalt et al. |
| 5,835,884 A | 11/1998 | Brown |
| 6,263,684 B1 | 7/2001 | Plante |
| 6,581,458 B1 | 6/2003 | Hathaway et al. |
| 6,611,769 B2 | 8/2003 | Olson |
| 6,681,189 B1 | 1/2004 | Morrison et al. |
| 7,120,543 B2 | 10/2006 | Belke et al. |
| 7,225,685 B2 | 6/2007 | Kawamoto et al. |
| 2005/0126306 A1 | 6/2005 | Wang et al. |
| 2007/0136008 A1 | 6/2007 | Liu et al. |

* cited by examiner

*Primary Examiner*—John H Le
(74) *Attorney, Agent, or Firm*—Erickson, Kernell, Derusseau & Kleypas, LLC

(57) ABSTRACT

An electronic flow meter having sensors to determine the temperature and flow rate of a fluid flowing through the flow meter and into a downstream circuit, such as a cooling water circuit, of known diameter is flowing under turbulent or laminar conditions based upon a calculation of a corresponding Reynolds number and comparison of the calculated Reynolds number to Reynolds numbers indicative of the desired flow characteristic. A display is provided to indicate the flow characteristic of the fluid flowing through the flow meter as determined by the processor.

4 Claims, 3 Drawing Sheets

ELECTRONIC FLOW CHARACTERISTIC INDICATING FLOW METER

BACKGROUND OF THE INVENTION

The present invention relates to flow meters and in particular flow meters which can be utilized to indicate if the liquid flowing through a piping system associated therewith is flowing under turbulent or laminar flow conditions.

Water flowing turbulently is much more efficient at removing heat in a cooling system than water flowing under laminar flow conditions. However, once turbulent flow is obtained increasing the flow rate further does not appreciably improve the cooling rate of the system. In molding applications, many mold operators unnecessarily try to maximize the flow of water through their cooling systems to ensure turbulent flow. Doing so simply increases the energy costs for pumping more water than necessary through the system and possibly limiting the amount of cooling water available for cooling additional molds on the same cooling system circuit.

Whether the flow of water through a pipe or channel is turbulent depends on the diameter of the pipe, the flow rate of the water through the pipe and the temperature of the water. For a pipe or cooling channel of known diameter, if the temperature of the water is known, one can determine what flow rate would be required to obtain turbulent flow. More specifically, the volumetric flow rate times the pipe diameter divided by the kinematic viscosity (which is temperature dependent) produces what is referred to as the Reynolds number. A Reynolds number of approximately 3500 or more is understood to be indicative of turbulent flow.

Injection molds generally have cooling water channels of a fixed diameter. The diameters for different molds vary but standard diameters are ¼, ⅜, ½, ¾ and 1 inch. Additional diameters are also utilized. One type of flow meter currently in use is a variable area flow meter having a float, piston or other movable flow indicator, slidably mounted on a conical post within a clear cylindrical tube. The piston is restrained from flowing out the distal end of the cylindrical tube by a spring. Water flowing through the chamber pushes the piston toward the distal end of the chamber against the force of the spring. The greater the flow rate, the more the piston compresses the spring and moves toward the distal end. A brightly colored band or indicator band extending around the piston is visible through the clear cylindrical tube and through a window or sight formed in the flow meter body. A scale printed along the side of the sight, indicates the flow rate therethrough such as in gallons per minute. See generally U.S. Pat. No. 4,619,139.

Electronic flow meters, such as the TRACER® electronic flowmeter manufactured by Burger & Brown Engineering, Inc. uses an electronic sensor to determine the flow rate of a fluid flowing through the body of the flow meter and displays this information on a liquid crystal display mounted on the body of the flow meter. The Tracer flow meter includes a machined brass body with a flow passageway extending therethrough and an impeller mounted in the flow chamber. One of the fins or vanes of the impeller has a magnet mounted thereon. A processor with a display and toggle buttons is mounted on the body. A counter type sensor extends from the processor into a depression in the body and senses and counts the rotations of the magnet on the impeller. The processor calculates the flow rate based upon the pulses sensed by the sensor. A temperature sensor also extends from the processor into a depression in the body to measure the temperature of the water flowing therethrough. The measured flow rate and temperature are shown on the display and additional information can be viewed using the toggle buttons. However, the Tracer flowmeter does not display any information concerning the flow characteristic of the fluid flowing therethrough.

Utilizing existing flow meters, the current practice for determining whether the flow through the associated piping system is turbulent involves first determining the flow rate of the fluid therethrough using the flow meter. The flow rate measurement is used with the temperature of the fluid flowing therethrough and the size of the conduit to determine a Reynolds number for the fluid flowing therethrough. The Reynolds number is typically obtained from a standard chart or the like. However, such a system is somewhat time consuming and is not conducive to allowing a quick determination of whether the flow rate selected will result in turbulent flow through the system. There remains a need for a flow meter which can be used by a user to more readily determine whether the fluid flowing through a piping system associated therewith is flowing under turbulent flow conditions and to set the flow rate accordingly. It is also foreseen that there are likely to be applications for such a device which can be used by a user to determine whether the fluid flowing through a piping system is flowing under laminar flow conditions.

SUMMARY OF THE INVENTION

The present invention comprises an electronic flow meter having a flow rate sensor to determine the flow rate of a fluid flowing therethrough, a temperature sensor to determine the temperature of the fluid flowing therethrough and a processor programmed to determine whether the fluid flowing through the flow meter and into a downstream circuit, such as a cooling water circuit, of known diameter is flowing under turbulent or laminar conditions. A display is provided with the electronic flow meter to provide an indication of the flow characteristic of the fluid flowing therethrough as determined by the processor. The flow meter can be connected to a process control system to communicate the flow characteristic to the process control system and provide feedback control to control for example a valve controlling the flow rate through the system.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. Therefore specific structural and functional details disclosed herein are not to be interpreted as limiting, but merely as a basis for the claims and as a representative basis for teaching one skilled in the art to variously employ the present invention in virtually any appropriately detailed structure.

Figure 1:
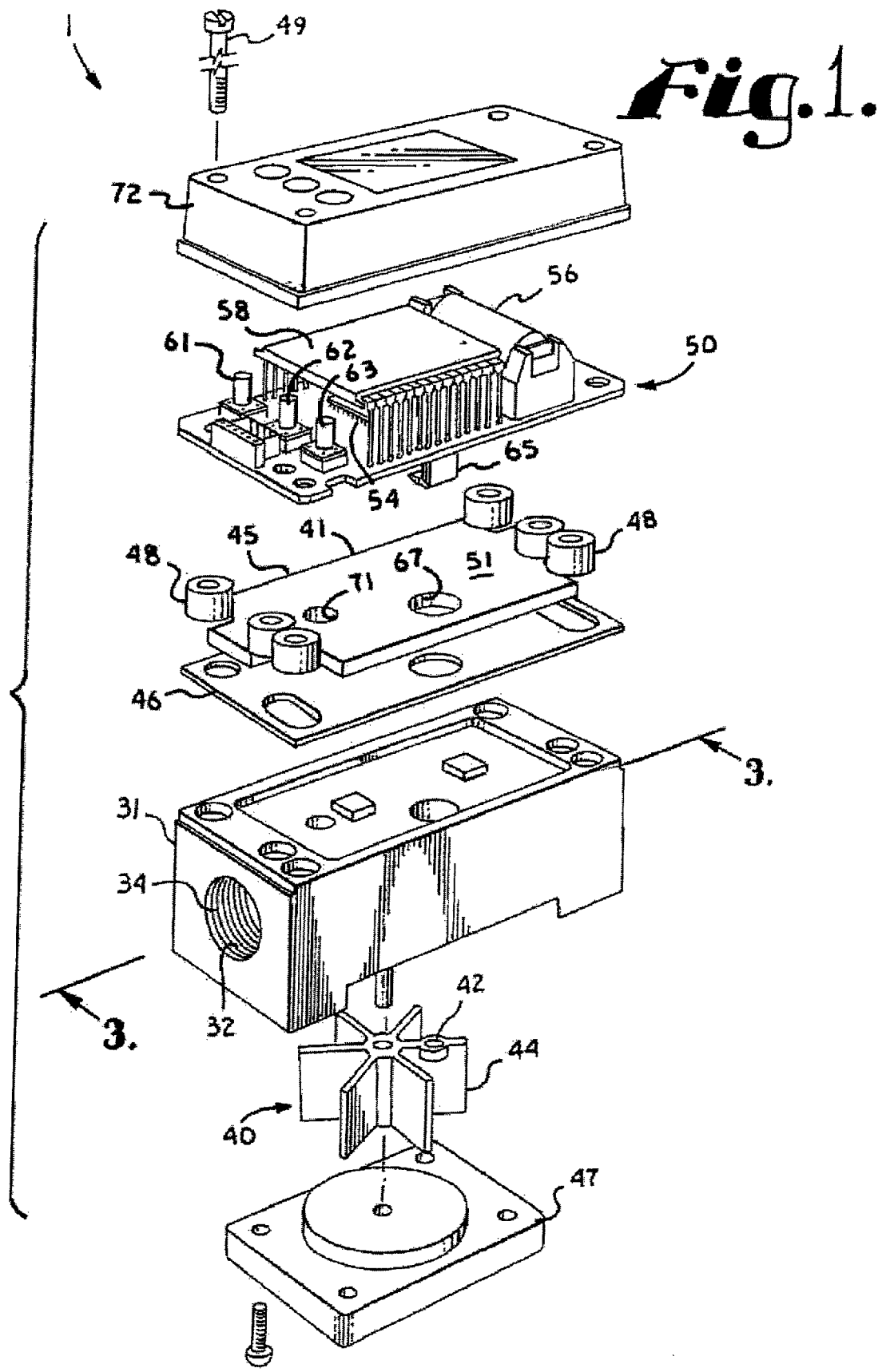
FIG. 1 is an exploded, perspective view of an electronic flow meter of the present invention.
Figure 2:
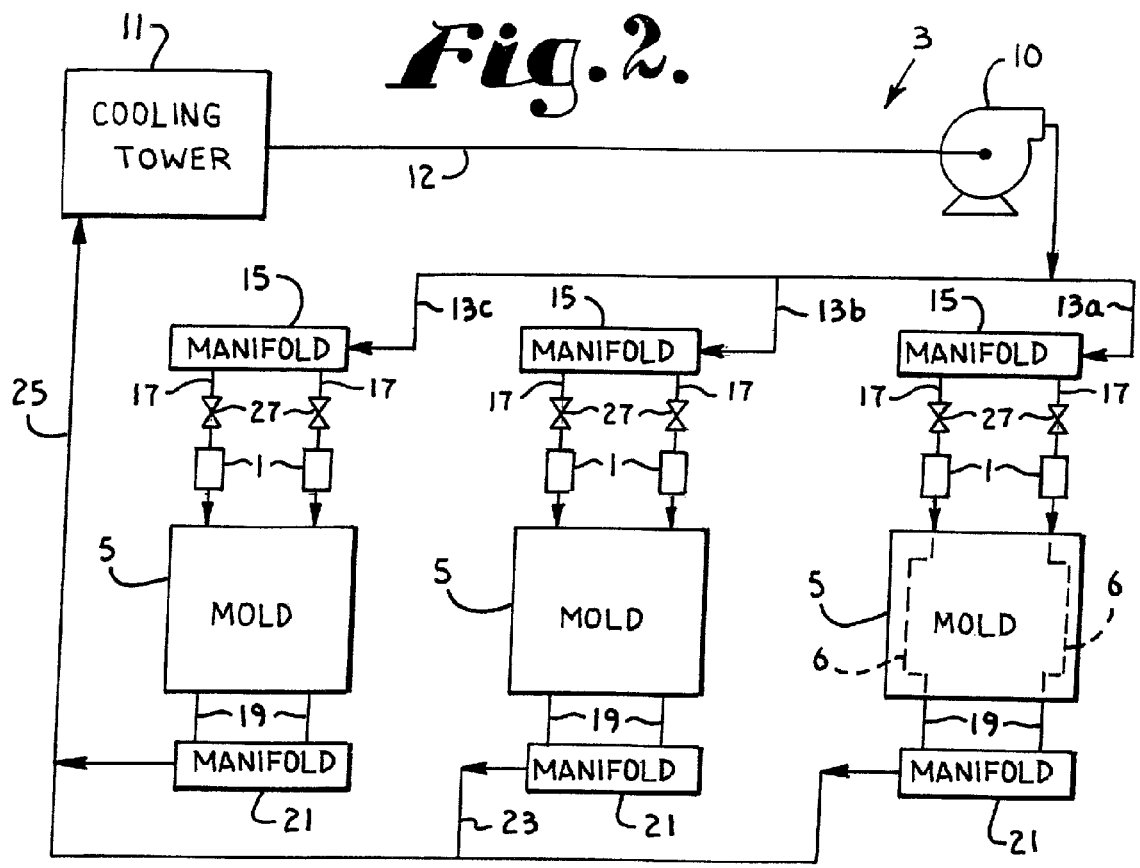
FIG. 2 is a schematic diagram of a mold cooling system utilizing flow meters of the present invention.
Figure 3:
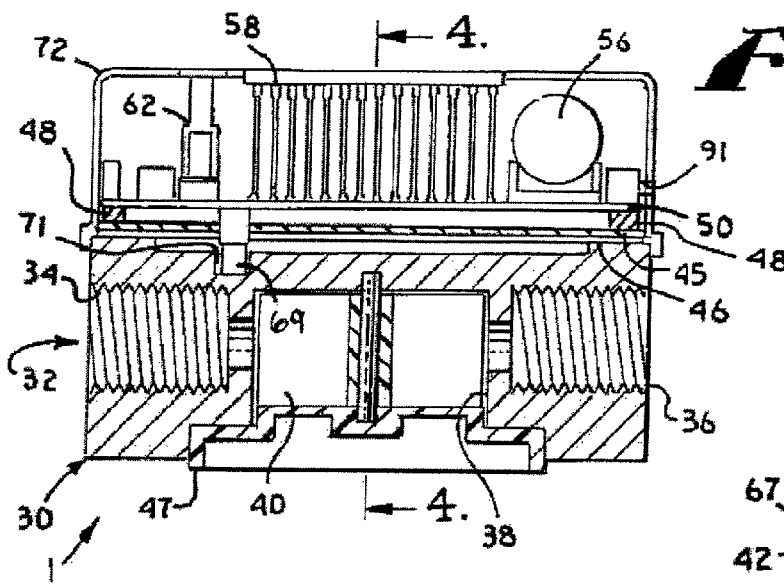
FIG. 3 is an enlarged, cross-sectional view of the flow meter taken along line 3-3 of FIG. 1.
Figure 4:
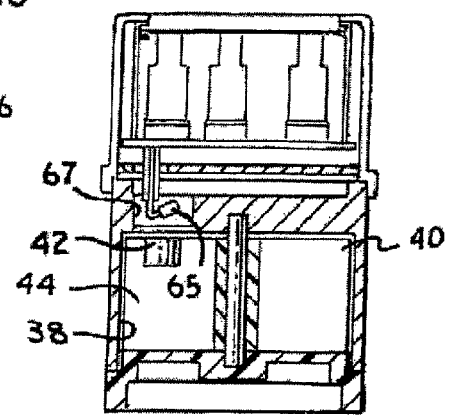
FIG. 4 is a cross-sectional view of the flow meter taken along line 4-4 of FIG. 3.

Referring to the drawings in more detail and in particular FIGS. 1, 3 and 4, the reference numeral 1 refers to a flow meter. The flow meter 1 is particularly well adapted for use in monitoring the flow of water through a cooling water circulation system 3 for an injection molding facility as shown schematically in FIG. 2.

FIG. 2 comprises a process flow diagram of a representative cooling water circulation system 3 for supplying cooling water to a plurality of injection molds 5 utilizing flow meters 1 as described herein. Each mold 5 has an internal or mold cooling water circuit or piping system 6 formed therein for directing cooling water around one or more mold cavities (not shown) formed in the mold 5. Each mold 5 may include multiple mold cooling water circuits 6 associated with different mold cavities. In the flow diagram of FIG. 2, each mold 5 is shown as having two mold cooling water circuits 6. The mold cooling water circuits 6 are formed from channels or bores formed in the mold 5 of generally uniform internal diameter. Standard dimensions for such channels for molds 5 made and used in the United States are ¼, ⅜, ¾, ½ or 1 inch.

Cooling water is circulated through the cooling water circulation system 3 by a pump 10. Pump 10 pumps cooling water from a cooling tower 11 through a supply line 12, and manifold supply branches 13a, 13b and 13c to a plurality of cooling water supply manifolds 15, each one flow connected to one of the molds 5. Each manifold 15 splits the flow of cooling water into a plurality of mold supply lines 17. Two mold supply lines 17 are shown flow connecting each manifold 15 to the two mold cooling water circuits 6 of each mold 5. However, it is to be understood that the number of cooling water circuits 6 per mold 5 and the number of mold cavities associated with each cooling water circuit 6 can vary.

A cooling water return line 19 connects each cooling water circuit 6 to a return manifold 21. In the embodiment shown in FIG. 2, two return lines 19 are shown, one associated with each cooling water circuit 6. A cooling water return branch 23 connects each return manifold 21 to a main return line 25 which returns the cooling water pumped therethrough back to the cooling tower 11.

A flow meter 1 is shown flow connected to each mold supply line 17 in FIG. 2 and a flow control valve 27 is positioned on each mold supply line 17 upstream of the associated flow meter 1. The control valves 27 control the flow rate of cooling water through each mold cooling water circuit 6. It is to be understood that the flow meters 1 generally only have to be positioned in-line with the cooling water circuit 6 and therefore, the flow meters 1 and flow control valves 27 can also be positioned downstream of the mold 5 on the cooling water return line 19 of the mold for controlling the flow of cooling water through the associated mold cooling water circuit 6. It is to be understood that the cooling system 3 shown in FIG. 2 is simply representative of one application of the flow meter 1 of the present invention.

Returning to FIGS. 1, 3 and 4, the construction of the flow meter 1 is similar to the construction of the TRACER® flowmeter discussed previously. The flow meter 1 includes a body assembly 30 with main body 31 which in the preferred embodiment is formed of metal, such as brass. A flow passageway 32 is formed in the main body 31. The flow passageway includes an inlet 34, an outlet 36 and an internal chamber 38. An impeller 40 is rotatably mounted in the internal chamber 38. A small magnet 42 is mounted on one of the fins or vanes 44 of the impeller 40 proximate an upper edge thereof and in outwardly spaced relation from a hub or axis of rotation of the impeller 40.

The body assembly 30 further includes an insulating panel 45, gasket 46 and an access panel 47. The access panel provides access to the internal chamber 38 of the main body 31 for mounting of the impeller 40. Insulated spacers 48 and bolts 49 are utilized to mount a circuit board or electronics assembly to the flow meter body assembly 30. The insulating panel is formed from an insulating material and is adapted to thermally insulate the circuit board 50 from the flow meter main body 31. The insulated spacers also function to help thermally insulate the circuit board 50 from the main body 31.

The circuit board 50 is mounted to the main body 31 of the flow meter body assembly 30. The circuit board 50 includes a processor 54, a power supply or battery 56, a liquid crystal display 58 and three control buttons or knobs 61, 62 and 63. A flow rate sensor 65 projects downward from the bottom of the circuit board 50 and extends into a first depression or recess 67 formed in the flow meter body assembly 30 in line with the path of travel of the magnet 42 on the impeller 40. The flow rate sensor 65 is a pulse pick-up type sensor which senses the magnetic pulses as the magnet 42 rotates past the sensor 65. The processor counts the number of pulses per unit time and uses this information to calculate the flow rate of the fluid flowing therethrough.

A temperature sensor 69 also projects downward from the bottom of the circuit board 50 and extends into a second depression or recess 71. The temperature sensor 69 measures the temperature of the brass flow meter body 30 which should correspond to the temperature of the fluid flowing therethrough. Neither recess 67 nor recess 71 open into the flow passageway 32 and therefore, neither the flow rate sensor 65 nor the temperature sensor 69 contacts the fluid flowing therethrough. The processor 54, the battery 56, the display 58 and the control buttons 62, 63 and 64 along with the flow rate sensor 65 and temperature sensor 69 are enclosed in a housing 72 and may be collectively referred to as an electronics assembly.

The processor 54 can be pre-programmed to include the diameter of the cooling water circuit 6 with which the flow meter is to be used. Alternatively, the processor 54 is programmed to allow an operator to use the control buttons 62-64 to select or input a diameter corresponding to the diameter of the cooling water circuit. The processor 54 is further programmed to use the calculated flow rate and measured temperature with the pre-programmed or known diameter to calculate a Reynolds number associated therewith for water, or another selected fluid.

The Reynolds number (which is unitless) is the ratio of inertial forces to viscous forces in a fluid or liquid and can be used to identify different flow regimes, such as laminar or turbulent flow. Laminar flow occurs at low Reynolds numbers where viscous forces are dominant and is characterized by smooth, constant fluid motion. Turbulent flow occurs at high Reynolds numbers where inertial forces dominate, producing random eddies, vortices and other flow fluctuations. These flow fluctuations or mixing of the water increases the cooling affect of the cooling water.

The formula for determining the Reynolds number for a pipe of circular cross-section may be given as the fluid density times the mean fluid velocity times the diameter divided by the dynamic fluid velocity. This formula may be simplified as the mean fluid velocity times the diameter divided by the kinematic fluid viscosity, where the kinematic fluid viscosity is the dynamic fluid viscosity divided by the fluid density. Because the viscosity of a fluid is temperature dependent, the flow rate of a fluid flowing through a pipe of a specified diameter required to achieve turbulent flow will vary depending on the temperature of the fluid. The Reynolds number increases with increases in temperature. Therefore, the higher the temperature of the fluid flowing through a pipe, the lower the flow rate required to obtain turbulent flow.

The transition between laminar and turbulent flow is often indicated by a critical Reynolds number. For pipes of circular cross-section, the critical Reynolds number is generally accepted to be 2300. However, within a certain range around the critical Reynolds number, the flow is neither fully laminar nor fully turbulent. Therefore, to ensure turbulent flow, flow conditions, including flow rate, temperature and pipe diameter for a known fluid, are generally selected to result in a Reynolds number of at least 3000 and preferably at least 4000. To ensure laminar flow, flow conditions are generally selected to result in a Reynolds number of 2000 or less.

Figure 5:
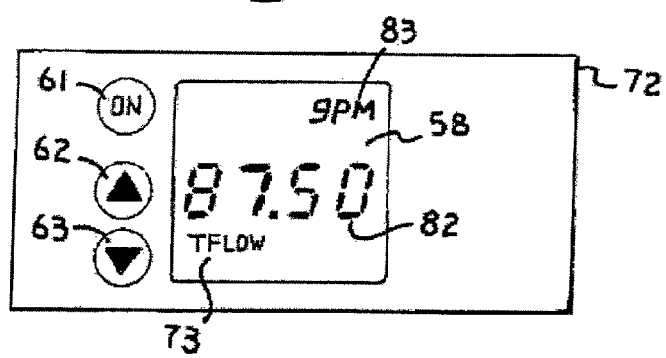
FIG. 5 is a top plan view of the flow meter showing a first screen display of a display panel on the electronic flow meter.
Figure 6:
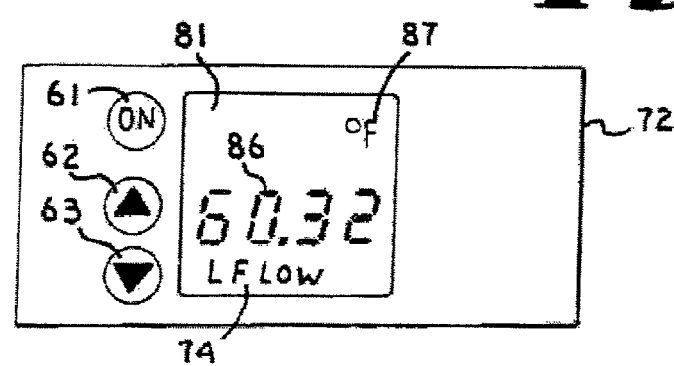
FIG. 6 is a top plan view of the flow meter showing a second screen display of the display panel on the electronic flow meter.

The processor 54 compares the calculated Reynolds number to a Reynolds number known to result in turbulent flow, so for example, in the preferred embodiment, the calculated Reynolds number is compared to the number 4000. If the calculated Reynolds number is greater than 4000, a turbulent flow indicating icon 73 (such as "TFLOW") can be displayed on the flow meter display 58 to provide an operator an indication that the flow is turbulent as shown in FIG. 5. It is to be understood that the processor could also compare the calculated Reynolds number to the number 2000 and if determined to be less, the processor could cause a laminar flow indicating icon 74 (such as the symbol "LFLOW") to be displayed on the flow meter display 58 as shown in FIG. 6.

The information or data displayed on the display 58 is controlled by the three buttons or switches 61, 62 and 63. Button 61 is an on/off button and turns the display on and off. The second and third buttons or up and down buttons 62 and 63 allow the user to scroll through or display different information. For example, when the display 58 is turned on, an initial display screen 81 displays the flow rate 82 and the selected flow rate units 83, i.e gallons per minute (gpm) or liters per minute (lpm). See FIG. 5. Pressing the up button 62 once will then advance to a second display screen 85 displaying the temperature 86 and the selected temperature units 87, i.e. Fahrenheit or Celsius. See FIG. 6. Pressing the up button 62 a second time will then advance to a third display screen, not shown, showing a calculated value of BTU/m. Pressing the down button 63 from the temperature display screen 85 will advance back to the flow rate display screen 81. The processor 54 is further programmed to allow calibration of the information displayed on the screen and to select units to be displayed in a manner consistent with that utilized with the existing TRACER® flow meter.

Because the display 58 on which the flow characteristic indicator is displayed is mounted directly on the flow meter 1, a process operator can quickly determine, by visual inspection near the process equipment, whether the system is operating under the desired flow characteristic, such as turbulent or laminar flow, and if not, manually adjust the flow rate by adjusting the valves 27 controlling flow through the cooling circuit 6 of the mold 5 or other process equipment. If the system is not operating under the desired flow characteristic, no flow indicating icon 73 or 74 will appear on the display 58. It is to be understood that the processor 54 could be programmed to only show the turbulent flow indicating icon 73 or the laminar flow indicating icon 74 if the corresponding conditions, i.e. Reynolds number comparison is met. Alternatively, the processor 54 could be programmed to show both icons 73 and 74 when the corresponding conditions were met.

The circuit board 50 may also include a data port 91 for communicating data from the processor 54 to a remote device such as a separate processor programmed to control the process equipment, such as valves 27, with which the flow meter 1 is utilized. Data may be communicated over cables or through other data communication means such as radio frequency transmitters. Data communicated could include the calculated Reynolds number, an indication of whether the calculated Reynolds number exceeds a minimum selected number indicative of turbulent flow or an indication of whether the calculated Reynolds number falls below a maximum selected number indicative of laminar flow.

It is to be understood that while certain forms of the present invention have been illustrated and described herein, it is not to be limited to the specific forms or arrangement of parts described and shown. For example, although a battery 56 is shown as the power supply for the processor 54, the display 58 and other components, power may be supplied to the electronics assembly from an external source through wires or cabling. In addition, although the flow rate sensor described in the preferred embodiment senses magnetic pulses from a rotating magnet on an impeller in the flow meter flow passageway, it is foreseen that other flow rate sensors could be utilized.

What is claimed is:

1. An electronic flow meter connectable in-line with a piping system for indicating flow characteristics of a known fluid flowing through the piping system of known internal diameter comprising:
   a) a flow meter body having a flow passageway extending therethrough;
   b) an electronics assembly mounted directly on said flow meter body and including a processor, a power supply, a display, a temperature sensor and a flow rate sensor; said temperature sensor communicating a measured temperature indicative of the temperature of the known fluid flowing through said flow passageway to said processor and said flow rate sensor communicating a measured value indicative of the flow rate of the known fluid flowing through said flow meter to said processor; said processor programmed to calculate a calculated flow rate using the measured value; and said processor programmed to calculate a calculated Reynolds number associated with the known fluid flowing through pipe of the known internal diameter at the measured temperature and the calculated flow rate; said processor programmed to compare the calculated Reynolds number versus an established Reynolds number indicative of whether laminar flow exists and to display a laminar flow indicating icon on the display if the comparison determines that laminar flow exists.

2. An electronic flow meter connectable in-line with a piping system for indicating flow characteristics of a known fluid flowing through the piping system of known internal diameter comprising:
   a) a flow meter body having a flow passageway extending therethrough;
   b) an electronics assembly mounted directly on said flow meter body and including a processor, a power supply, a display, a temperature sensor and a flow rate sensor; said temperature sensor communicating a measured temperature indicative of the temperature of the known fluid flowing through said flow passageway to said processor and said flow rate sensor communicating a measured value indicative of the flow rate of the known fluid flowing through said flow meter to said processor; said processor programmed to calculate a calculated flow rate using the measured value; and said processor programmed to calculate a calculated Reynolds number associated with the known fluid flowing through pipe of the known internal diameter at the measured temperature and the calculated flow rate; said processor programmed to compare the calculated Reynolds number versus an established Reynolds number indicative of whether fluid flow is turbulent and to display a turbulent flow indicating icon on the display if the calculated Reynolds number equals or exceeds the established Reynolds number.

3. A process for determining the flow characteristic of a fluid flowing through a piping system of known internal diameter using a flow meter connected in-line with the piping system wherein the flow meter includes a flow meter body having a flow passageway extending therethrough and an electronics assembly mounted directly on the flow meter body and including a processor, a power supply, a display, a temperature sensor and a flow rate sensor; the process comprising the steps of selecting the known pipe diameter in the processor, communicating a measured temperature indicative of the temperature of the known fluid flowing through the flow passageway of the flow meter body from the temperature sensor to the processor and communicating a measured value indicative of the flow rate of the known fluid flowing through the flow meter from the flow rate sensor to the processor and programming the processor to calculate a calculated flow rate using the measured value; and programming the processor to calculate a calculated Reynolds number associated with the known fluid flowing through pipe of the known pipe diameter at the measured temperature and the calculated flow rate; comparing the calculated Reynolds number to an established Reynolds number indicative of whether turbulent flow exists and causing the display to display a turbulent flow indicating icon if the calculated Reynolds number equals or exceeds the established Reynolds number.

4. A process for determining the flow characteristic of a fluid flowing through a piping system of known internal diameter using a flow meter connected in-line with the piping system wherein the flow meter includes a flow meter body having a flow passageway extending therethrough and an electronics assembly mounted directly on the flow meter body and including a processor, a power supply, a display, a temperature sensor and a flow rate sensor; the process comprising the steps of selecting the known pipe diameter in the processor, communicating a measured temperature indicative of the temperature of the known fluid flowing through the flow passageway of the flow meter body from the temperature sensor to the processor and communicating a measured value indicative of the flow rate of the known fluid flowing through the flow meter from the flow rate sensor to the processor and programming the processor to calculate a calculated flow rate using the measured value; and programming the processor to calculate a calculated Reynolds number associated with the known fluid flowing through pipe of the known pipe diameter at the measured temperature and the calculated flow rate; comparing the calculated Reynolds number to an established Reynolds number indicative of whether laminar flow exists and causing the display to display a laminar flow indicating icon if the calculated Reynolds number equals or is less than the established Reynolds number.

\* \* \* \* \*